(12) United States Patent
Lian (10) Patent No.: US 9,848,238 B2
(45) Date of Patent: Dec. 19, 2017

(54) MEDIA PLAYBACK METHOD AND DEVICE (71) Applicant: Huawei Technologies Co., Ltd., Shenzhen (CN)

(72) Inventor: Shiguo Lian, Beijing (CN)

(73) Assignee: HUAWEI TECHNOLOGIES CO., LTD., Shenzhen (CN)

( * ) Notice: Subject to any disclaimer, the term of this patent is extended or adjusted under 35 U.S.C. 154(b) by 17 days.

(21) Appl. No.: 14/560,395

(22) Filed: Dec. 4, 2014

(65) Prior Publication Data

US 2015/0139612 A1    May 21, 2015

Related U.S. Application Data

(63) Continuation of application No. PCT/CN2013/070260, filed on Jan. 9, 2013.

(30) Foreign Application Priority Data

Jun. 6, 2012    (CN) .......................... 2012 1 0184200

(51) Int. Cl.
    *H04N 9/80*        (2006.01)
    *H04N 5/77*        (2006.01)
    (Continued)

(52) U.S. Cl.
    CPC ....... *H04N 21/44218* (2013.01); *G06F 21/10* (2013.01); *G06F 21/606* (2013.01);
    (Continued)

(58) Field of Classification Search
None
See application file for complete search history.

(56) References Cited

U.S. PATENT DOCUMENTS 6,111,517 A * 8/2000 Atick ..................... G06F 21/32
                                                           340/5.83
7,134,130 B1 * 11/2006 Thomas ................. H04N 7/163
                                                            348/E7.061
(Continued)

FOREIGN PATENT DOCUMENTS

CN         101211484 A     7/2008
CN         101330591 A     12/2008
(Continued)

OTHER PUBLICATIONS

Partial English Translation and Abstract of Chinese Patent Application No. CN101625716A, Mar. 5, 2015, 39 pages.
(Continued)

*Primary Examiner* — Hung Dang
(74) *Attorney, Agent, or Firm* — Conley Rose, P.C.

(57) ABSTRACT

A media playback method and device that relate to the field of computer technologies are provided. The method includes turning on a camera to detect the number of human eyes within a shooting range to determine an initial number of viewers when a user performs a media playback activity, detecting, at a set interval, the number of human eyes to determine a current number of viewers, and encrypting a playback image when the current number of viewers is greater than the initial number of viewers. The method is applicable when a user views information, such as a text, a picture, or a video, on a device such as a mobile phone terminal, a pad device, or a computer.

18 Claims, 5 Drawing Sheets

(51) Int. Cl.
  *H04N 21/442* (2011.01)
  *G06F 21/10* (2013.01)
  *G06F 21/60* (2013.01)
  *H04N 5/913* (2006.01)
  *H04N 21/4223* (2011.01)
  *H04N 21/4408* (2011.01)

(52) U.S. Cl.
  CPC ......... *H04N 5/913* (2013.01); *H04N 21/4223* (2013.01); *H04N 21/4408* (2013.01); *H04N 2005/91357* (2013.01)

(56) References Cited

U.S. PATENT DOCUMENTS

| | | | | |
|---|---|---|---|---|
| 8,922,480 | B1* | 12/2014 | Freed | G09G 5/00 345/156 |
| 2004/0221303 | A1* | 11/2004 | Sie | G06Q 30/02 725/29 |
| 2006/0210167 | A1* | 9/2006 | Inoue | G06F 21/32 382/190 |
| 2009/0025024 | A1 | 1/2009 | Beser et al. | |
| 2009/0285545 | A1* | 11/2009 | Bon | H04N 7/163 386/239 |
| 2010/0191631 | A1* | 7/2010 | Weidmann | G06F 3/013 705/34 |
| 2011/0206285 | A1* | 8/2011 | Hodge | G06F 21/84 382/224 |
| 2011/0215932 | A1 | 9/2011 | Daniel | |
| 2011/0261038 | A1 | 10/2011 | Jiang et al. | |
| 2012/0056803 | A1* | 3/2012 | Kubota | H04N 5/77 345/156 |
| 2013/0232523 | A1* | 9/2013 | Daniel | H04N 21/4223 725/25 |
| 2013/0232580 | A1* | 9/2013 | Daniel | H04L 63/102 726/28 |

FOREIGN PATENT DOCUMENTS

| | | |
|---|---|---|
| CN | 101625716 A | 1/2010 |
| CN | 102096419 A | 6/2011 |
| CN | 102147855 A | 8/2011 |
| CN | 102237020 A | 11/2011 |
| JP | 2005346307 A | 12/2005 |
| JP | 2008276274 A | 11/2008 |
| JP | 2010028404 A | 2/2010 |
| JP | 2010128778 A | 6/2010 |
| KR | 100794114 B1 | 1/2008 |
| WO | 2008142697 A2 | 11/2008 |
| WO | 2011085384 A2 | 7/2011 |

OTHER PUBLICATIONS

Partial English Translation and Abstract of Chinese Patent Application No. CN101211484A, Jan. 4, 2015, 3 pages.
Partial English Translation and Abstract of Chinese Patent Application No. CN101330591A, Jan. 4, 2015, 4 pages.
Partial English Translation and Abstract of Chinese Patent Application No. CN102147855A, Jan. 4, 2015, 2 pages.
Foreign Communication From a Counterpart Application, PCT Application No. PCT/CN2013/070260, English of International Search Report dated Apr. 18, 2013, 3 pages.
Foreign Communication From a Counterpart Application, PCT Application No. PCT/CN2013/070260, English Translation of Written Opinion dated Apr. 18, 2013, 3 pages.
Partial English Translation and Abstract of Japanese Patent Application No. 2010028404, Feb. 4, 2010, 25 pages.
Foreign Communication From a Counterpart Application, Korean Application No. 10-2014-7036452, Korean Office Action dated Feb. 16, 2016, 5 pages.
Foreign Communication From a Counterpart Application, Korean Application No. 10-2014-7036452, English Translation of Korean Office Action dated Feb. 29, 2016, 7 pages.
Foreign Communication From a Counterpart Application, Japanese Application No. 2015-515371, Japanese Notice of Allowance dated Feb. 9, 2016, 3 pages.
Foreign Communication From a Counterpart Application, European Application No. 13800944.4, Extended European Search Report dated Jul. 7, 2015, 6 pages.

\* cited by examiner

MEDIA PLAYBACK METHOD AND DEVICE

CROSS-REFERENCE TO RELATED APPLICATIONS

This application is a continuation of International Application No. PCT/CN2013/070260, filed on Jan. 9, 2013, which claims priority to Chinese Patent Application No. 201210184200.8, filed on Jun. 6, 2012, both of which are hereby incorporated by reference in their entireties.

TECHNICAL FIELD

The present invention relates to the field of computer technologies, and in particular, to a media playback method and device.

BACKGROUND

With development of multimedia technologies and popularization of personal electronic devices, people often use a device in their lives, such as a mobile phone, a tablet computer (pad), or a computer in various situations, to perform some behavior involving media playbacks that relate to personal privacy, such as a video chat, a video call, a video playback, and picture and text reading. When a user uses these devices to perform the foregoing behavior in a public place, it is likely to divulge private information of the user, which causes an economic loss or a loss of another kind to the user.

With regard to the foregoing situation, there are mainly two solutions in the prior art. One solution is that a device screen is improved by using polarization, refraction, or another optical technology to enable a user to view information on the screen only from an angle, within a certain range, to the front of the screen, so that the information on the screen cannot be viewed when a certain angle, for example, 30 degrees, is formed between a line of sight and the front of the screen, thereby achieving a purpose of privacy protection. The other solution is that an image is captured by using a camera of a device to perform face recognition on a current user, and once an unauthorized face is detected within a field of view of the camera, an image on the screen is switched, so as to prevent peeping and protect user privacy.

In a process of implementing the present invention, the inventor finds that the prior art has at least the following problems. The improvement of a device screen not only increase a device cost but also blocks a part of perspective rays of the screen, which affects a viewing effect of a user. In addition, peeping from a direction directly in front of the screen still cannot be prevented. Face recognition via a device camera is excessively dependent on a face detection technology, and imposes a relatively high requirement on a shooting range. For a device with a small screen, for example, a mobile phone, in most cases, a face of a peeper may not completely appear within a shooting range of the camera, and the peeper can view the screen from a side. Therefore, an effect of preventing peeping cannot be achieved.

SUMMARY

According to a media playback method and device provided in embodiments of the present invention, a camera of the device is used to detect eyes of a peeper by using an eye recognition technology, thereby resolving a problem that a private media playback behavior of a user in a public place is peeped at, and protecting private information of the user.

The technical solutions used in the embodiments of the present invention are as follows.

A media playback method is provided including turning on a camera to detect the number of human eyes within a shooting range to determine an initial number of viewers when a user performs a media playback activity, detecting the number of human eyes at a set interval to determine a current number of viewers, and encrypting a playback image when the current number of viewers is greater than the initial number of viewers.

A media playback device is provided including a first determining unit configured to turn on a camera to detect the number of human eyes within a shooting range to determine an initial number of viewers when a user performs a media playback activity and a processing unit configured to detect the number of human eyes at a set interval to determine a current number of viewers and encrypt a playback image when the current number of viewers is greater than the initial number of viewers.

Compared with the prior art, embodiments of the present invention use a method in which a device camera and an eye detection technology are combined. Changes to the number of human eyes within a shooting range of a camera are compared, so as to determine whether there is another person peeping at a device screen. If a person peeps, content being played is encrypted. Compared with traditional face detection, the embodiments of the present invention implement that the face of a peeper does not completely appear within a shooting range of the camera, the peeper can be detected as long as eyes of the peeper appear within the shooting range. In this way, detection precision is improved greatly, which prevents private information of a user from being peeped by a peeper, and protects information security of the user.

BRIEF DESCRIPTION OF DRAWINGS

To describe the technical solutions in the embodiments of the present invention more clearly, the following briefly introduces the accompanying drawings required for describing the embodiments or the prior art. The accompanying drawings in the following description show merely some embodiments of the present invention, and a person of ordinary skill in the art may still derive other drawings from these accompanying drawings without creative efforts.

DESCRIPTION OF EMBODIMENTS

The following clearly describes the technical solutions in the embodiments of the present invention with reference to the accompanying drawings in the embodiments of the present invention. The described embodiments are merely a part rather than all of the embodiments of the present invention. All other embodiments obtained by a person of ordinary skill in the art based on the embodiments of the present invention without creative efforts shall fall within the protection scope of the present invention.

To make the advantages of the technical solutions of the present invention clearer, the following describes the present invention in detail with reference to the accompanying drawings and embodiments.

Embodiment 1

Figure 1:
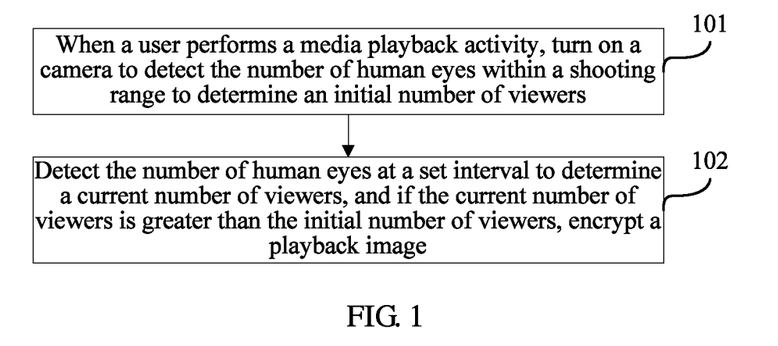
FIG. 1 is a flowchart of a method according to Embodiment 1 of the present invention.

This embodiment provides a media playback method. As shown in FIG. 1, the method includes the following.

101. When a user performs a media playback activity, turn on a camera to detect the number of human eyes within a shooting range to determine an initial number of viewers.

For example, content of the media playback activity may be a video, a picture, a text, or the like. In a process of turning on the camera to detect the number of human eyes within the shooting range, the camera may be manually turned on. For example, an anti-peep shortcut key is set, the camera is associated with the anti-peep shortcut key, and after the anti-peep shortcut key is used to turn on the camera, the camera automatically executes an anti-peep function. The camera may also be associated with a playback device, and when a playback activity is detected, the camera is automatically turned on to execute the anti-peep function.

Further, after the initial number of viewers is determined, the camera detects the number of human eyes once within a set interval to determine a current number of viewers. If the current number of viewers is less than or equal to the initial number of viewers, the initial number of viewers is updated, and the current number of viewers is used as an updated initial number of viewers. Preset duration may be set by a user, for example, 30 milliseconds (ms).

102. Detect the number of human eyes at a set interval to determine the current number of viewers, and if the current number of viewers is greater than the initial number of viewers, encrypt a playback image.

Specifically, before the encrypting a playback image, the method further includes determining whether to increase the number of viewers if the current number of viewers is greater than the initial number of viewers, updating the initial number of viewers if it is determined to increase the number of viewers, and using the current number of viewers as an updated initial number of viewers, determining whether to adjust a screen angle if it is determined not to increase the number of viewers, continuing a playback activity if it is determined to adjust the screen angle, after the screen angle is adjusted and it is detected that the number of viewers is restored to the initial number of viewers, and encrypting the playback image if it is determined not to adjust the screen angle. For example, the encrypting a playback image may be replacing the playback image with a preset text, picture, animation, or the like.

Further, after the encrypting a playback image, the method further includes determining whether it is required to stop the playback activity, ending the playback activity if it is required to stop the playback activity, and resuming the playback activity if it is not required to stop the playback activity.

Compared with the prior art, this embodiment of the present invention uses a method in which a device camera and an eye detection technology are combined. When a user performs an activity of playing back a video, a picture, or a text, an initial number of viewers is detected by using the camera, and the number of viewers is detected once within an interval of time. If it is found that a current number of viewers is less than the initial number of viewers, the initial number of viewers is updated, and the current number of viewers is used as an initial number of viewers. If it is found that the current number of viewers is greater than the initial number of viewers, it is determined whether it is required to perform encryption. After the user determines to perform the encryption, a playback image is encrypted. Compared with traditional face detection, the embodiments of the present invention implement that the face of a peeper does not completely appear within a shooting range of the camera, the peeper can be detected as long as eyes of the peeper appear within the shooting range. In this way, detection precision is improved greatly, which prevents private information of a user from being peeped by a peeper, and protects information security of the user.

Embodiment 2

Figure 2:
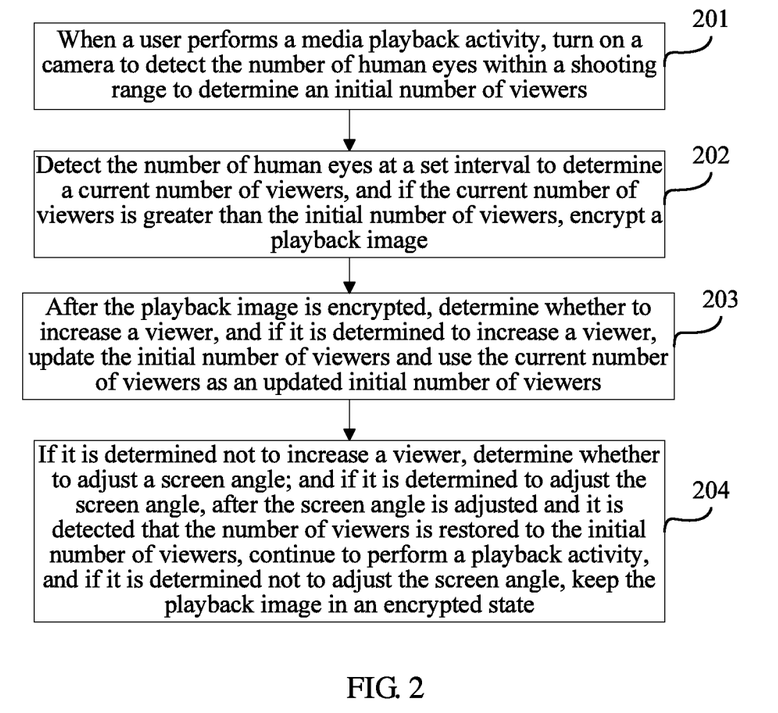
FIG. 2 is a flowchart of a method according to Embodiment 2 of the present invention.

This embodiment provides a media playback method. As shown in FIG. 2, the method includes the following.

201. When a user performs a media playback activity, turn on a camera to detect the number of human eyes within a shooting range to determine an initial number of viewers.

202. Detect the number of human eyes at a set interval to determine a current number of viewers, and if the current number of viewers is greater than the initial number of viewers, encrypt a playback image.

203. After the playback image is encrypted, determine whether to increase the number of viewers, and if it is determined to increase the number of viewers, update the initial number of viewers, and use the current number of viewers as an updated initial number of viewers.

204. If it is determined not to increase the number of viewers, determine whether to adjust a screen angle, and if it is determined to adjust the screen angle, after the screen angle is adjusted and it is detected that the number of viewers is restored to the initial number of viewers, continue to perform a playback activity, and if it is determined not to adjust the screen angle, keep the playback image in an encrypted state.

Further, after the keeping the playback image in an encrypted state, the method further includes determining whether it is required to stop the playback activity, and if it is required to stop the playback activity, ending the playback activity, and if it is not required to stop the playback activity, resuming the playback activity.

Compared with the prior art, this embodiment of the present invention uses a method in which a device camera and an eye detection technology are combined. When a user performs an activity of playing back a video, a picture, or a text, an initial number of viewers is detected by using the camera, and the number of viewers is detected once within an interval of time. If it is found that a current number of viewers is less than the initial number of viewers, the initial number of viewers is updated, and the current number of viewers is used as an initial number of viewers. If it is found that the current number of viewers is greater than the initial number of viewers, a playback image is instantly encrypted. If the user determines that it is not required to perform encryption, the playback activity can be resumed. Compared with traditional face detection, the embodiments of the present invention implement that the face of a peeper does not completely appear within a shooting range of the camera, the peeper can be detected as long as eyes of the peeper appear within the shooting range. In this way, detection precision is improved greatly, which prevents private information of a user from being peeped by a peeper, and protects information security of the user.

Embodiment 3

Figure 3A:
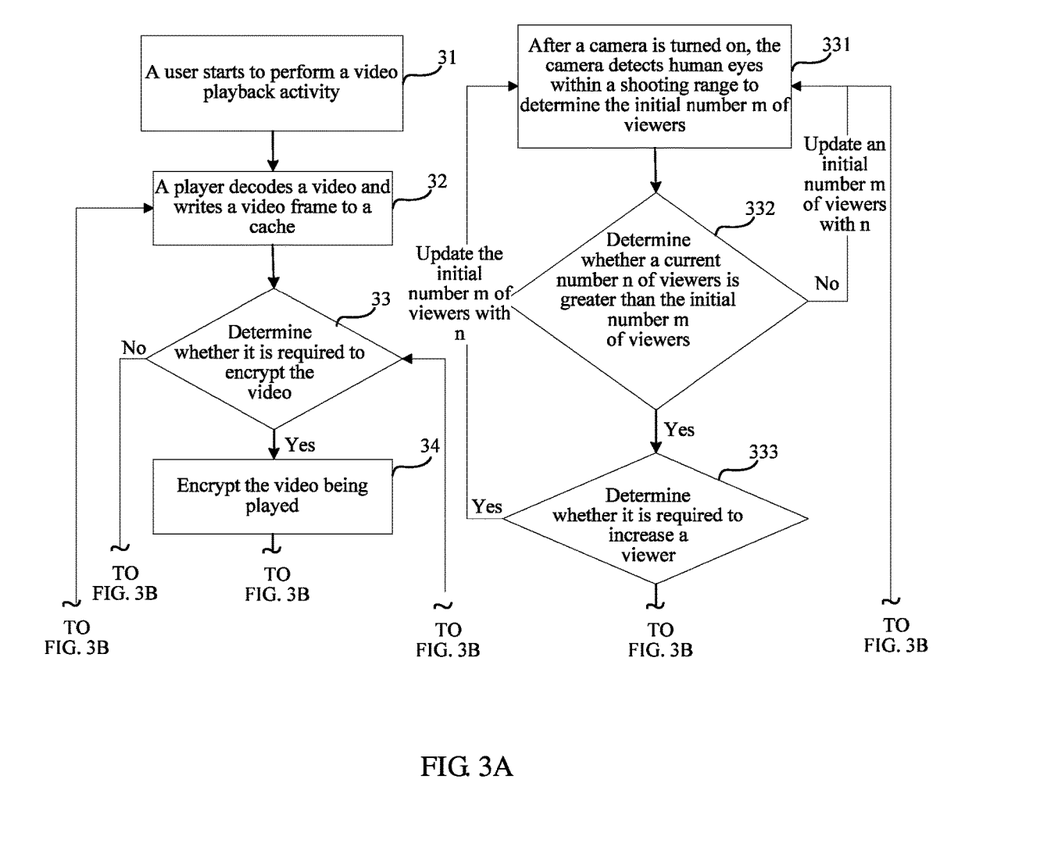
FIG. 3A and FIG. 3B is a flowchart of a method according to Embodiment 3 of the present invention.
Figure 3B:
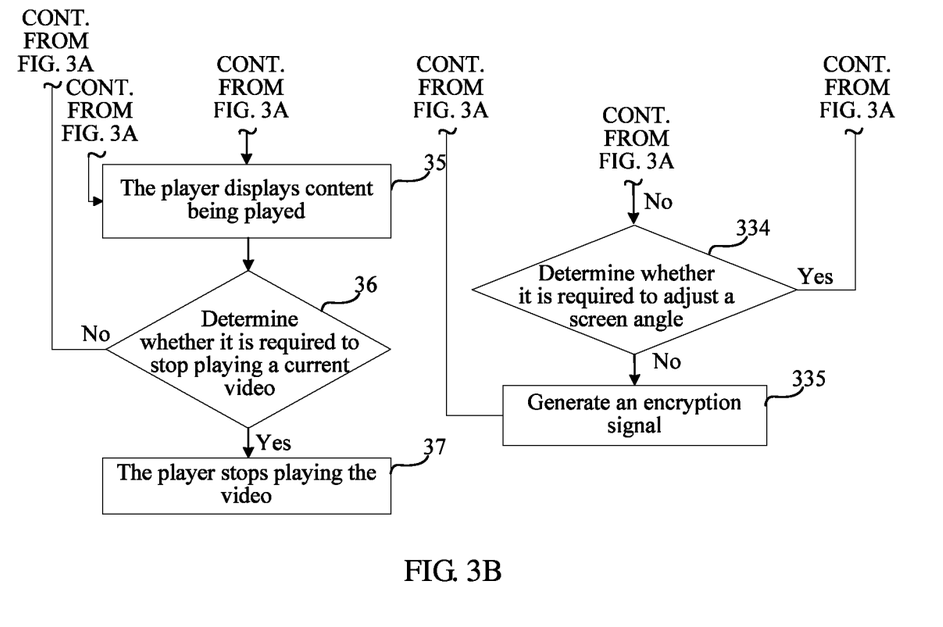

This embodiment provides a media playback method, and playing a video is used as an example. As shown in FIGS. 3A and 3B, the method includes the following.

31. A user starts to perform a video playback activity.

Optionally, in addition to a video, content of a media playback may be a picture, a text, or the like. Optionally, before determining to perform a playback activity or when performing a playback activity, the user turns on a camera to detect the number of human eyes within a shooting range to determine an initial number of viewers. The camera may be manually turned on. For example, an anti-peep shortcut key is set, the camera is associated with the anti-peep shortcut key, and after the anti-peep shortcut key is used to turn on the camera, the camera automatically executes an anti-peep function. The camera may also be associated with a playback device, and when a playback activity is detected, the camera is automatically turned on to execute the anti-peep function.

32. A player decodes a video and writes a video frame to a cache.

33. Determine whether it is required to encrypt the video according to an encryption signal, and if it is required to encrypt the video, perform steps 34 to 35, and if it is not required to perform the encryption, perform step 35.

Specifically, the encryption signal is acquired by performing the following steps.

331. After the camera is turned on, the camera detects human eyes within a shooting range to determine an initial number m of viewers.

332. At an interval of 30 ms, detect the human eyes within the shooting range to determine whether a current number n of viewers is greater than the initial number m of viewers. If n is greater than m, perform step 333, and if n is less than or equal to m, perform step 331 and update the initial number m of viewers with n, where a detection time interval of 30 ms is set manually, and a user can set a detection time interval as required, or a fixed time interval is used when a device is delivered from a factory.

333. The user determines whether it is required to increase the number of viewers; and if it is required to increase the number of viewers, perform step 331 and update the initial number m of viewers with n, and if it is not required to increase the number of viewers, perform step 334.

334. The user determines whether it is required to adjust a screen angle to prevent an increased viewer from viewing the video, and if it is required to adjust the screen angle, perform step 331 after the screen angle is adjusted, and if it is not required to adjust the screen angle, perform step 335.

335. Generate the encryption signal.

34. Encrypt the video being played.

For example, encrypting a playback image may be replacing an image of the original video with a preset text, picture, animation, or the like.

35. The player displays content being played.

Further, after the player displays the content being played, if the user does not continue to view the video, the method may further include the following.

36. Determine whether it is required to stop playing the current video, and if it is required to stop playing the current video, perform step 37, and if it is not required to stop playing the current video, perform step 32.

37. The player stops playing the video.

It should be noted that in this embodiment, after it is found that the current number of viewers is greater than the initial number of viewers, it is first determined whether it is required to increase the number of viewers and whether it is required to adjust an angle. The video is encrypted only when neither increase of a viewer nor angle adjustment is required. Further, after it is found that the current number of viewers is greater than the initial number of viewers, the step of encryption may further be instantly performed. After the encryption is performed, it is determined whether it is required to increase the number of viewers and whether it is required to adjust the angle, so as to determine whether to resume a playback. Compared with the previous method, the method can protect user privacy more securely, but it reduces sensory experience of the user viewing the video.

Compared with the prior art, this embodiment of the present invention uses a method in which a device camera and an eye detection technology are combined. When a user performs an activity of playing back a video, a picture, or a text, an initial number of viewers is detected by using the camera, and the number of viewers is detected once within an interval of time. If it is found that a current number of viewers is less than the initial number of viewers, the initial number of viewers is updated, and the current number of viewers is used as an initial number of viewers. If it is found that the current number of viewers is greater than the initial number of viewers, it is determined whether it is required to perform encryption. After the user determines to perform the encryption, a playback image is encrypted. Compared with traditional face detection, the embodiments of the present invention implement that the face of a peeper does not completely appear within a shooting range of the camera, the peeper can be detected as long as eyes of the peeper appear within the shooting range. In this way, detection precision is improved greatly, which prevents private information of a user from being peeped by a peeper, and protects information security of the user.

Embodiment 4

Figure 4:
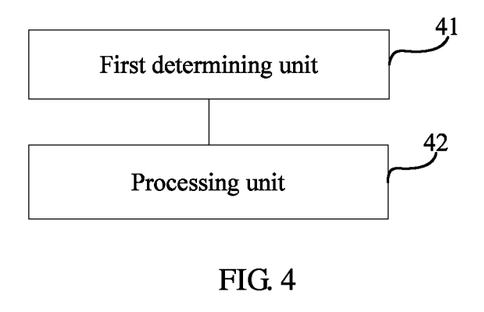
FIG. 4 and FIG. 5 are schematic structural diagrams of a device according to Embodiment 4 of the present invention.

This embodiment provides a media playback device. As shown in FIG. 4, the device includes a first determining unit 41 configured to turn on a camera to detect the number of human eyes within a shooting range to determine an initial number of viewers when a user performs a media playback activity and a processing unit 42 configured to detect the number of human eyes at a set interval to determine a current number of viewers and, if the current number of viewers is greater than the initial number of viewers, encrypt a playback image.

Further, the processing unit 42 is further configured to detect the number of human eyes at the set interval to determine the current number of viewers, and if the current number of viewers is less than or equal to the initial number of viewers, update the initial number of viewers and use the current number of viewers as an updated initial number of viewers.

Figure 5:
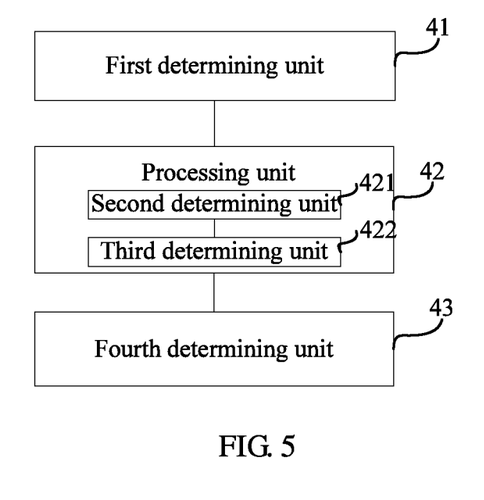

Further, as shown in FIG. 5, the processing unit 42 includes a second determining unit 421 configured to determine whether to increase the number of viewers when the current number of viewers is greater than the initial number of viewers, update the initial number of viewers and use the current number of viewers as an updated initial number of viewers when it is determined to increase the number of viewers, and let a third determining unit perform execution when it is determined not to increase the number of viewers. The processing unit 42 also includes a third determining unit 422 configured to determine whether to adjust a screen angle, continue to perform a playback activity when it is determined to adjust the screen angle, after the screen angle is adjusted and it is detected that the number of viewers is restored to the initial number of viewers, and encrypt the playback image when it is determined not to adjust the screen angle.

Further, as shown in FIG. 5, the device further includes a fourth determining unit 43 configured to determine whether it is required to stop the playback activity and, when it is required to stop the playback activity, end the playback activity, and when it is not required to stop the playback activity, resume the playback activity.

The turning on a camera to detect the number of human eyes within a shooting range includes manually turning on the camera, or associating the camera with a playback device, and when a playback activity is detected, automatically turning on the camera. Content played in the playback activity includes a video, a picture, or a text.

Compared with the prior art, this embodiment of the present invention uses a method in which a device camera and an eye detection technology are combined. When a user performs an activity of playing back a video, a picture, or a text, an initial number of viewers is detected by using the camera, and the number of viewers is detected once within an interval of time. If it is found that a current number of viewers is less than the initial number of viewers, the initial number of viewers is updated, and the current number of viewers is used as an initial number of viewers. If it is found that the current number of viewers is greater than the initial number of viewers, it is determined whether it is required to perform encryption. After the user determines to perform the encryption, a playback image is encrypted. Compared with traditional face detection, the embodiments of the present invention implement that the face of a peeper does not completely appear within a shooting range of the camera, the peeper can be detected as long as eyes of the peeper appear within the shooting range. In this way, detection precision is improved greatly, which prevents private information of a user from being peeped by a peeper, and protects information security of the user.

Embodiment 5

Figure 6:
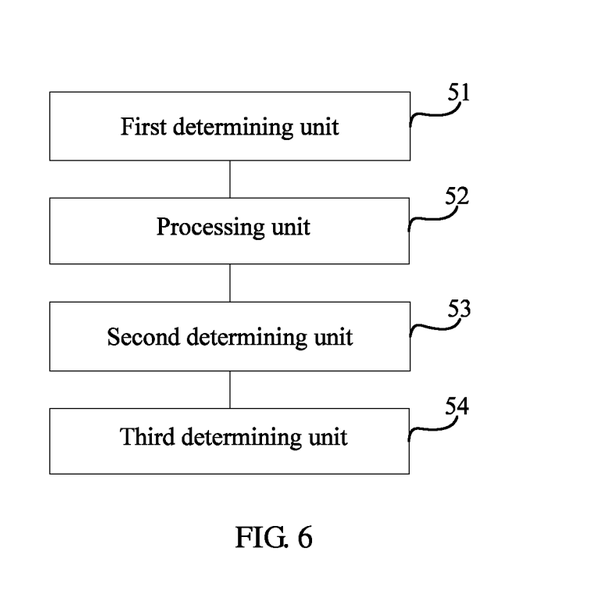
FIG. 6 and FIG. 7 are schematic structural diagrams of a device according to Embodiment 5 of the present invention.

This embodiment provides a media playback device. As shown in FIG. 6, the device includes a first determining unit 51 configured to turn on a camera to detect the number of human eyes within a shooting range to determine an initial number of viewers when a user performs a media playback activity, a processing unit 52 configured to detect the number of human eyes at a set interval to determine a current number of viewers and encrypt a playback image if the current number of viewers is greater than the initial number of viewers, a second determining unit 53 configured to determine whether to increase the number of viewers when the current number of viewers is greater than the initial number of viewers, update the initial number of viewers and use the current number of viewers as an updated initial number of viewers when it is determined to increase the number of viewers, and let a third determining unit 54 perform execution when it is determined not to increase the number of viewers. The third determining unit 54 is configured to determine whether to adjust a screen angle and continue to perform a playback activity when it is determined to adjust the screen angle, after the screen angle is adjusted and it is detected that the number of viewers is restored to the initial number of viewers, and keep the playback image in an encrypted state when it is determined not to adjust the screen angle.

Figure 7:
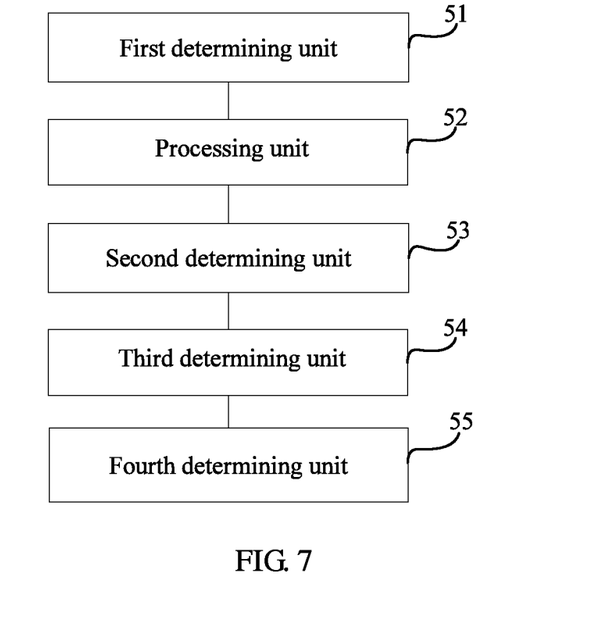

Further, as shown in FIG. 7, the device may further include a fourth determining unit 55 configured to determine whether it is required to stop the playback activity, end the playback activity when it is required to stop the playback activity, and resume the playback activity when it is not required to stop the playback activity.

Compared with the prior art, this embodiment of the present invention uses a method in which a device camera and an eye detection technology are combined. When a user performs an activity of playing back a video, a picture, or a text, an initial number of viewers is detected by using the camera, and the number of viewers is detected once within an interval of time. If it is found that a current number of viewers is less than the initial number of viewers, the initial number of viewers is updated, and the current number of viewers is used as an initial number of viewers. If it is found that the current number of viewers is greater than the initial number of viewers, a playback image is instantly encrypted. If the user determines not to perform encryption, the playback activity may be restored. Compared with traditional face detection, the embodiments of the present invention implement that the face of a peeper does not completely appear within a shooting range of the camera, the peeper can be detected as long as eyes of the peeper appear within the shooting range. In this way, detection precision is improved greatly, which prevents private information of a user from being peeped by a peeper, and protects information security of the user.

The media playback devices provided in the embodiments of the present invention can implement the method embodiments provided in the foregoing. For detailed function implementation, refer to descriptions in the method embodiments. Details are not described herein again. The media playback method and device provided in the embodiments of the present invention may be applicable when a user views information, such as a text, a picture, or a video, on a device such as a mobile phone terminal, a pad device, or a computer, which is not limited thereto.

A person of ordinary skill in the art may understand that all or a part of the processes of the methods in the embodiments may be implemented by a computer program instructing relevant hardware. The program may be stored in a computer readable storage medium. When the program runs, the processes of the methods in the embodiments are performed. The storage medium may include a magnetic disk, an optical disc, a read-only memory (ROM), or a random access memory (RAM).

The foregoing descriptions are merely specific embodiments of the present invention, but are not intended to limit the protection scope of the present invention. Any variation or replacement readily figured out by a person skilled in the art within the technical scope disclosed in the present invention shall fall within the protection scope of the present invention. Therefore, the protection scope of the present invention shall be subject to the protection scope of the claims.

What is claimed is:

1. A media playback method, comprising:
using a camera to detect an initial number of viewers within a shooting range during a media playback activity;
detecting, by the camera, a current number of viewers within the shooting range at a set interval during the media playback activity;

comparing the current number of viewers to the initial number of viewers;
determining whether to increase the initial number of viewers when the current number of viewers is greater than the initial number of viewers;
updating the initial number of viewers to the current number of viewers to obtain an updated initial number of viewers when the initial number of viewers is being increased;
encrypting a playback image during the media playback activity by replacing the playback image with a preset text, picture or animation when the initial number of viewers is not being increased;
detecting, by the camera, whether any viewers continue to view the playback image within the shooting range; and
stopping the media playback activity when no viewers are viewing the playback image.

2. The media playback method according to claim 1, comprising decreasing the initial number of viewers to the current numbers of viewers at the set interval when the current number of viewers is less than or equal to the initial number of viewers.

3. The media playback method according to claim 1, wherein after encrypting the playback image, the method further comprises:
determining whether to stop the media playback activity;
ending the media playback activity when the media playback activity is to be stopped; and
resuming the media playback activity when the media playback activity is not to be stopped.

4. The media playback method according to claim 1, wherein using the camera comprises manually turning on the camera.

5. The media playback method according to claim 1, wherein turning on the camera comprises:
associating the camera with a playback device; and
automatically turning on the camera when detecting the media playback activity.

6. The media playback method according to claim 1, wherein content played during the media playback activity comprises a video, a picture, or a text.

7. The media playback method according to claim 1, wherein the initial number of viewers is unknown until the camera is turned on.

8. A media playback method, comprising:
using a camera to detect an initial number of viewers within a shooting range during a media playback activity;
detecting, by the camera, a current number of viewers within the shooting range at a set interval during the media playback activity;
comparing the current number of viewers to the initial number of viewers to determine whether the current number of viewers is greater than the initial number of viewers;
determining whether to increase the initial number of viewers after a playback image is encrypted, wherein the initial number of viewers is updated to the current number of viewers to obtain an updated initial number of viewers when the initial number of viewers is being increased;
encrypting a playback image during the media playback activity by replacing the playback image with a preset text, picture or animation when the initial number of viewers is not being increased;
detecting whether any viewers continue to view the playback image within the shooting range; and
stopping the media playback activity when no viewers are viewing the playback image, wherein the playback image during the media playback activity is kept in an encrypted state when the initial number of viewers is not being increased.

9. The media playback method according to claim 8, wherein after keeping the playback image in an encrypted state, the method further comprises:
determining whether to stop the media playback activity and ending the media playback activity when the media playback activity is to be stopped; and
resuming the media playback activity when the media playback activity is not to be stopped.

10. A media playback device, comprising:
a memory comprising instructions; and
a processor coupled to the memory, wherein the instructions cause the processor to be configured to:
use a camera to detect an initial number of viewers within a shooting range during a media playback activity;
detect a current number of viewers within the shooting range at a set interval during the media playback activity;
determine whether to increase the initial number of viewers when the current number of viewers is greater than the initial number of viewers;
compare the current number of viewers to the initial number of viewers;
encrypt a playback image during the media playback activity by replacing a playback image with a preset text, picture or animation when the initial number of viewers is not being increased;
detect whether any viewers continue to view the playback image within the shooting range; and
stop the media playback activity when no viewers are viewing the playback image.

11. The media playback device according to claim 10, wherein the instructions further cause the processor to be configured to: update the initial number of viewers to the current number of viewers to obtain an updated initial number of viewers when the current number of viewers is less than or equal to the initial number of viewers.

12. The media playback device according to claim 10, wherein the instructions further cause the processor to be configured to:
update the initial number of viewers to the current number of viewers to obtain an updated initial number of viewers when the initial number of viewers is to be increased;
perform execution when the initial number of viewers is not to be increased; and
determine whether to adjust a screen angle, wherein the media playback activity is continued when the screen angle is to be adjusted, and wherein a playback image during the media playback activity is kept encrypted when the screen angle is not to be adjusted.

13. The media playback device according to claim 10, wherein the instructions further cause the processor to be configured to:
determine whether to stop the media playback activity and end the media playback activity when the media playback activity is to be stopped; and
resume the media playback activity when the media playback activity is not to be stopped.

14. The media playback device according to claim 10, wherein the instructions further cause the processor to be configured to manually turn on the camera.

15. The media playback device according to claim 10, wherein the instructions further cause the processor to be configured to:
- associate the camera with a playback device; and
- automatically turn on the camera when detecting the media playback activity.

16. The media playback device according to claim 10, wherein content during the media playback activity comprises a video, picture, or a text.

17. A media playback device, comprising:
- a memory comprising instructions; and
- a processor coupled to the memory, wherein the instructions cause the processor to be configured to:
  - turn on a camera to detect a number of human eyes within a shooting range to determine an initial number of viewers during a media playback activity;
  - determine the number of human eyes detected by the camera at a set interval to determine a current number of viewers;
  - compare the current number of viewers to the initial number of viewers determined by the camera to determine whether the current number of viewers is greater than the initial number of viewers;
  - determine whether to increase the initial number of viewers when the current number of viewers is greater than the initial number of viewers;
  - update the initial number of viewers and use the current number of viewers to obtain an updated initial number of viewers when the initial number of viewers is being increased;
  - encrypt a playback image during the media playback activity by replacing a playback image with a preset text, picture or animation when the initial number of viewers is not being increased;
  - determine whether to adjust a screen angle, wherein a playback activity is continued when the screen angle is to be adjusted, and wherein the playback image is kept in an encrypted state when the screen angle is not being adjusted;
  - detect whether any viewers continue to view the playback image within the shooting range; and
  - stop the media playback activity when no viewers are viewing the playback image.

18. The media playback device according to claim 17, wherein the instructions further cause the processor to be configured to:
- determine whether to stop the media playback activity and ending the media playback activity when the media playback activity is to be stopped; and
- resume the media playback activity when the media playback activity is not to be stopped.

* * * * *